US011920841B2

(12) United States Patent
Ishimura et al.

(10) Patent No.: US 11,920,841 B2
(45) Date of Patent: Mar. 5, 2024

(54) AIR-CONDITIONING APPARATUS (71) Applicant: Mitsubishi Electric Corporation, Tokyo (JP)

(72) Inventors: Shohei Ishimura, Tokyo (JP); Soshi Ikeda, Tokyo (JP); Kazuya Watanabe, Tokyo (JP); Hideto Nakao, Tokyo (JP); Masakazu Kondo, Tokyo (JP); Yasuhide Hayamaru, Tokyo (JP); Yusuke Tashiro, Tokyo (JP); Masakazu Sato, Tokyo (JP); Atsushi Kawashima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 407 days.

(21) Appl. No.: 17/428,278

(22) PCT Filed: Mar. 25, 2019

(86) PCT No.: PCT/JP2019/012446
§ 371 (c)(1),
(2) Date: Aug. 4, 2021

(87) PCT Pub. No.: WO2020/194435
PCT Pub. Date: Oct. 1, 2020

(65) Prior Publication Data
US 2022/0107123 A1  Apr. 7, 2022

(51) Int. Cl.
*F25B 47/02* (2006.01)
*F24F 11/41* (2018.01)
*F24F 11/86* (2018.01)

(52) U.S. Cl.
CPC .............. *F25B 47/02* (2013.01); *F24F 11/41* (2018.01); *F24F 11/86* (2018.01)

(58) Field of Classification Search
CPC ............ F25B 47/02; F25B 2313/02522; F25B 2313/0253; F25B 2313/0313; F25B 2600/2501; F24F 11/41; F24F 11/86
See application file for complete search history.

(56) References Cited

U.S. PATENT DOCUMENTS 9,506,674 B2 * 11/2016 Morimoto ............... F25B 13/00
2013/0098092 A1 * 4/2013 Wakamoto ............. F25B 30/02
62/278

(Continued)

FOREIGN PATENT DOCUMENTS

JP    2008-157558 A    7/2008
JP    2010-281492 A   12/2010

(Continued)

OTHER PUBLICATIONS

Australian Examination Report dated Aug. 12, 2022 in correspoding Australian Patent Application No. 2019436796, 3 pages.

(Continued)

*Primary Examiner* — Lionel Nouketcha
(74) *Attorney, Agent, or Firm* — XSENSUS LLP (57) ABSTRACT

An air-conditioning apparatus includes a main circuit in which a compressor, a flow switching device, an indoor heat exchanger, a pressure reducing device, and a plurality of parallel heat exchangers connected in parallel with each other are connected by pipes, a bypass pipe, a flow control device provided to the bypass pipe and configured to adjust a flow rate of refrigerant flowing through the bypass pipe, an evaporating pressure sensor configured to measure an evaporating pressure of the refrigerant, and a controller. The air-conditioning apparatus is configured to operate in a normal heating operation mode and a heating-defrosting operation mode. When an operation associated with the normal heating operation mode is switched to an operation associated with the heating-defrosting operation mode, the (Continued)

controller adjusts an opening degree of the flow control device using the evaporating pressure in the parallel heat exchanger and a driving frequency of the compressor.

16 Claims, 7 Drawing Sheets

(56) References Cited

U.S. PATENT DOCUMENTS

| | | | |
|---|---|---|---|
| 2015/0292756 A1* | 10/2015 | Takenaka | F24F 5/001 62/160 |
| 2015/0292789 A1* | 10/2015 | Takenaka | F25D 21/006 62/140 |
| 2016/0370045 A1 | 12/2016 | Takenaka et al. | |
| 2017/0370627 A1 | 12/2017 | Takenaka et al. | |

FOREIGN PATENT DOCUMENTS

| | | |
|---|---|---|
| WO | 2014/083867 A1 | 6/2014 |
| WO | 2015/129080 A1 | 9/2015 |
| WO | 2016/113851 A1 | 7/2016 |
| WO | 2017/098669 A1 | 6/2017 |
| WO | 2017/138108 A1 | 8/2017 |

OTHER PUBLICATIONS

Office Action dated May 30, 2022, in corresponding Swedish patent Application No. 2151167-0, 11 pages.
International Search Report and Written Opinion dated May 28, 2019, received for PCT Application PCT/JP2019/012446, Filed on Mar. 25, 2019, 13 pages including English Translation.
Notice of Reasons for Refusal dated Sep. 3, 2019, received for JP Application 2019-543126, 10 pages including English Translation.
Office Action dated May 7, 2022, in corresponding Chinese patent Application No. 201980093888.9, 21 pages.

* cited by examiner

AIR-CONDITIONING APPARATUS

CROSS-REFERENCE TO RELATED APPLICATION

The present application is based on PCT filing PCT/JP2019/012446, filed Mar. 25, 2019, the entire contents of which are incorporated herein by reference.

TECHNICAL FIELD

The present disclosure relates to an air-conditioning apparatus, and more particularly, relates to removal of frost on an outdoor heat exchanger.

BACKGROUND ART

There have recently been increasing instances where, instead of boiler heaters that perform heating by burning fossil fuel, heat pump air-conditioning apparatuses using air as a heat source have been used in cold climate areas in terms of global environment protection. Such a heat pump air-conditioning apparatus can perform efficient heating because heat is supplied from the air in addition to electrical input to a compressor.

In the heat pump air-conditioning apparatus, however, an outdoor heat exchanger exchanging heat between outdoor air and refrigerant while operating as an evaporator is more likely to be frosted as the temperature of the outside air outside, for example, a building, is lower. It is therefore necessary to perform defrosting to melt frost on the outdoor heat exchanger. Examples of methods for defrosting include a method including reversing the direction of flow of the refrigerant in a heating operation to supply the refrigerant from the compressor to the outdoor heat exchanger. In this method, heating a room may be stopped during defrosting, causing the room to become less comfortable.

Some air-conditioning apparatuses are designed to perform a heating-defrosting operation, in which heating can be performed during defrosting, and include multiple parallel heat exchangers connected in parallel as divided outdoor heat exchangers. In some developed methods, while one of the parallel heat exchangers is being defrosted, the other parallel heat exchangers operate as evaporators to remove heat from the outside air for heating (refer to Patent Literature 1 and Patent Literature 2, for example). The parallel heat exchangers are defrosted by turns, thus achieving continuous heating without establishing the same refrigeration cycle as that in a cooling operation.

In an air-conditioning apparatus disclosed in Patent Literature 1, defrosting one of the parallel heat exchangers involves adjusting a flow control device provided to a bypass pipe and a pressure reducing device provided to a parallel pipe connected to the parallel heat exchanger to be defrosted. Adjusting the flow control device and the pressure reducing device controls the flow rate and pressure of refrigerant flowing through the parallel heat exchanger to be defrosted, thus achieving defrosting using latent heat of condensation.

In an air-conditioning apparatus disclosed in Patent Literature 2, defrosting one of the parallel heat exchangers involves adjusting either a combination of flow control devices provided to bypass pipes or a pressure reducing device provided in a main circuit between the parallel heat exchanger to be defrosted and an indoor heat exchanger. Adjusting either one of the combination of the flow control devices and the pressure reducing device can adjust the flow rate of refrigerant used for defrosting.

CITATION LIST

Patent Literature

Patent Literature 1: International Publication No. WO 2015/129080
Patent Literature 2: Japanese Unexamined Patent Application Publication No. 2008-157558

SUMMARY OF INVENTION

Technical Problem

In Patent Literature 1 and Patent Literature 2, part of discharged refrigerant enters the parallel heat exchanger that is defrosted in the heating-defrosting operation. Therefore, the distribution of amount of refrigerant flowing between the indoor heat exchanger and the parallel heat exchangers changes, unlike that in a normal heating operation. Too much refrigerant supplied to the parallel heat exchanger being defrosted leads to a lower heat exchange capacity of the indoor heat exchanger. This may lead to a lower heating capacity in the heating-defrosting operation.

In response to the above issue, it is an object of the present disclosure to provide an air-conditioning apparatus capable of defrosting parallel heat exchangers while maintaining heating capacity even in the heating-defrosting operation.

Solution to Problem

An air-conditioning apparatus of an embodiment of the present disclosure includes a main circuit in which a compressor, a flow switching device, an indoor heat exchanger, a pressure reducing device, and a plurality of parallel heat exchangers connected in parallel with each other are connected by pipes, the main circuit serving as a refrigerant circuit through which refrigerant is circulated, a bypass pipe connecting one of the pipes that is connected to a discharge side of the compressor and some of the pipes that are connected to the plurality of parallel heat exchangers, a flow control device provided to the bypass pipe and configured to adjust a flow rate of the refrigerant flowing through the bypass pipe, an evaporating pressure sensor configured to measure an evaporating pressure of the refrigerant, and a controller. The air-conditioning apparatus is configured to operate in a normal heating operation mode in which an operation is performed such that the plurality of parallel heat exchangers operate as evaporators and a heating-defrosting operation mode in which an operation is performed such that one of the plurality of parallel heat exchangers is defrosted and an other of the plurality of parallel heat exchangers operates as an evaporator. When the operation associated with the normal heating operation mode is switched to the operation associated with the heating-defrosting operation mode, the controller adjusts an opening degree of the flow control device using the evaporating pressure in the parallel heat exchanger that operates as an evaporator and a driving frequency of the compressor.

Advantageous Effects of Invention

According to the embodiment of the present disclosure, the controller adjusts the opening degree of the flow control device using the evaporating pressure in the parallel heat exchanger that operates as an evaporator and the driving frequency of the compressor upon switching from the normal heating operation to the heating-defrosting operation. Adjusting the opening degree of the flow control device on the basis of the evaporating pressure in the main circuit and the driving frequency of the compressor maintains the flow rate of the refrigerant supplied to the indoor heat exchanger, and enables the refrigerant to be supplied to the parallel heat exchanger that is defrosted while a reduction in heating capacity is being suppressed.

DESCRIPTION OF EMBODIMENTS

Air-conditioning apparatuses according to embodiments will be described below with reference to the drawings, for example. Note that components designated by the same reference signs in the following figures are the same components or equivalents. This note applies to the entire description of the embodiments described below. Furthermore, note that the relationship between the sizes of components in the figures may differ from that between the actual sizes of the components. Additionally, note that the forms of components described herein are intended to be illustrative only and the forms of the components are not intended to be limited to those described herein. In particular, combinations of the components are not intended to be limited only to those in the embodiments. A component in one embodiment can be used in another embodiment. High and low values of, for example, pressure and temperature, are not determined in relation to particular absolute values, but are relatively determined based on, for example, a status or an operation of, for example, an apparatus. For a plurality of devices of the same type, for example, distinguished from each other using letters, if the devices do not have to be distinguished from each other or specified, the letters may be omitted.

Embodiment 1

Figure 1:
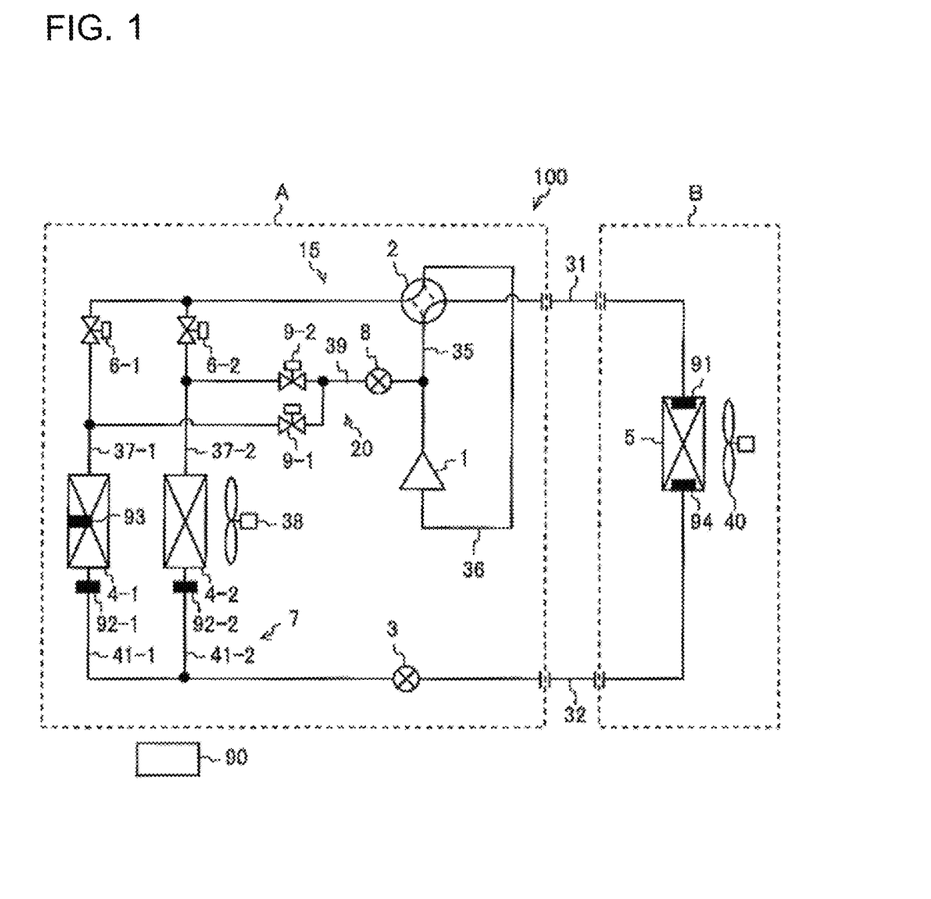
FIG. 1 is a diagram illustrating the configuration of an air-conditioning apparatus of Embodiment 1.

FIG. 1 is a diagram illustrating the configuration of an air-conditioning apparatus according to Embodiment 1. As illustrated in FIG. 1, an air-conditioning apparatus 100 is an apparatus that conditions air in an indoor space, serving as a target to be air-conditioned. The air-conditioning apparatus 100 according to Embodiment 1 includes an outdoor unit A, an indoor unit B, and a controller 90. The outdoor unit A includes a compressor 1, a flow switching device 2, parallel heat exchangers 4-1 and 4-2, an outdoor fan 38, a pressure reducing device 3, a bypass 20, first opening and closing devices 6-1 and 6-2, outdoor pressure sensors 92-1 and 92-2, and an outdoor temperature sensor 93. The indoor unit B includes an indoor heat exchanger 5, an indoor fan 40, an indoor pressure sensor 91, and an indoor temperature sensor 94. The outdoor unit A and the indoor unit B are connected by a first extension pipe 31 and a second extension pipe 32. Although the air-conditioning apparatus 100 including the single outdoor unit A and the single indoor unit B is illustrated in Embodiment 1, the air-conditioning apparatus 100 may include two or more outdoor units A and two or more indoor units B.

In the air-conditioning apparatus 100, the compressor 1, the flow switching device 2, the parallel heat exchangers 4-1 and 4-2, the pressure reducing device 3, and the indoor heat exchanger 5 are connected by pipes, thus forming a main circuit 15, serving as a refrigerant circuit through which refrigerant is circulated. The main circuit 15 is a main part of the refrigerant circuit in the air-conditioning apparatus 100. The compressor 1 sucks low-temperature, low-pressure refrigerant, compresses the sucked refrigerant into high-temperature, high-pressure refrigerant, and discharges the refrigerant. The flow switching device 2 switches between directions in which the refrigerant flows through the refrigerant circuit, and incudes a four-way valve. A discharge side of the compressor 1 is connected to the flow switching device 2 by a discharge pipe 35. A suction side of the compressor 1 is connected to the flow switching device 2 by a suction pipe 36.

The parallel heat exchangers 4-1 and 4-2 are provided to respective parallel pipes 7 connected in parallel between the flow switching device 2 and the pressure reducing device 3. The parallel heat exchangers 4-1 and 4-2 are, for example, outdoor heat exchangers that exchange heat between the refrigerant and outdoor air, which is air outside a building. Each of the parallel heat exchangers 4-1 and 4-2 operates as a condenser in a cooling operation, and operates as an evaporator in a heating operation. The parallel heat exchangers 4-1 and 4-2 are connected in parallel with each other. Although the air-conditioning apparatus 100 including, as the parallel heat exchangers 4-1 and 4-2, two heat exchangers connected in parallel is illustrated in Embodiment 1, the air-conditioning apparatus 100 may include three or more heat exchangers connected in parallel. It is assumed herein that the parallel heat exchangers 4-1 and 4-2 have the same area of heat exchange and the same efficiency of heat exchange, that is, the same capacity.

The parallel pipes 7 connected to the parallel heat exchangers 4-1 and 4-2 include first connection pipes 37-1 and 37-2 adjacent to the flow switching device 2 and second connection pipes 41-1 and 41-2 adjacent to the pressure reducing device 3. The outdoor fan 38 sends the outdoor air to the parallel heat exchangers 4-1 and 4-2. Although the single outdoor fan 38 sending the outdoor air to both the two parallel heat exchangers 4-1 and 4-2 is illustrated in Embodiment 1, any other configuration may be used. Two outdoor fans 38 may be arranged to send the outdoor air to the respective parallel heat exchangers 4-1 and 4-2.

The pressure reducing device 3 reduces the pressure of the refrigerant to expand the refrigerant. The pressure reducing device 3 in Embodiment 1 is, for example, an electronic expansion valve whose opening degree is adjustable. Although the pressure reducing device 3 disposed in the outdoor unit A of the air-conditioning apparatus 100 is illustrated in Embodiment 1, the pressure reducing device 3 may be disposed in the indoor unit B. The indoor heat exchanger 5 exchanges heat between the refrigerant and, for example, indoor air in a room, serving as an air-conditioned space. The indoor heat exchanger 5 operates as an evaporator in the cooling operation and operates as a condenser in the heating operation. The indoor fan 40 sends the indoor air to the indoor heat exchanger 5. The first opening and closing devices 6-1 and 6-2 are provided to the first connection pipes 37-1 and 37-2, respectively. While the first opening and closing devices 6-1 and 6-2 are open, the refrigerant flows through the parallel heat exchangers 4-1 and 4-2. While the first opening and closing devices 6-1 and 6-2 are closed, the refrigerant does not flow through the parallel heat exchangers 4-1 and 4-2. It is only required that the first opening and closing devices 6-1 and 6-2 are devices capable of opening and closing a passage. The first opening and closing devices 6-1 and 6-2 each include a solenoid valve, a four-way valve, a three-way valve, or a two-way valve.

In the bypass 20, a bypass pipe 39, a flow control device 8, and second opening and closing devices 9-1 and 9-2 are provided. The bypass pipe 39 connects the discharge side of the compressor 1 and the first connection pipes 37-1 and 37-2 to bypass the flow switching device 2. Part of the refrigerant discharged from the compressor 1 is diverted to and flows through the bypass pipe 39. The bypass pipe 39 may connect the first connection pipes 37-1 and 37-2 to a pipe connecting the flow switching device 2 and the first extension pipe 31. The second opening and closing devices 9-1 and 9-2 are provided to portions of the bypass pipe 39 that are connected to the parallel heat exchangers 4-1 and 4-2. While the second opening and closing devices 9-1 and 9-2 are open, the refrigerant flows through the parallel heat exchangers 4-1 and 4-2. While the second opening and closing devices 9-1 and 9-2 are closed, the refrigerant does not flow through the parallel heat exchangers 4-1 and 4-2. It is only required that the second opening and closing devices 9-1 and 9-2 are devices capable of opening and closing a passage. The second opening and closing devices 9-1 and 9-2 each include a solenoid valve, a four-way valve, a three-way valve, or a two-way valve.

The outdoor pressure sensors 92-1 and 92-2 are provided to the second connection pipes 41-2 and 41-2, respectively, and are located between the parallel heat exchangers 4-1 and 4-2 and the pressure reducing device 3. The outdoor pressure sensor 92-1 measures the pressure of the refrigerant flowing through the second connection pipe 41-1. The outdoor pressure sensor 92-2 measures the pressure of the refrigerant flowing through the second connection pipe 41-2. When the parallel heat exchangers 4-1 and 4-2 operate as condensers, the outdoor pressure sensors 92-1 and 92-2 function as condensing pressure sensors. When the parallel heat exchangers 4-1 and 4-2 operate as evaporators, the outdoor pressure sensors 92-1 and 92-2 function as evaporating pressure sensors. The outdoor pressure sensors 92-1 and 92-2 may be arranged on the suction side of the compressor 1 to measure a suction pressure. At a portion where the refrigerant is in a two-phase gas-liquid state, a temperature sensor to measure the temperature of the refrigerant may be used instead. In such a case, a temperature measured by the temperature sensor is converted, as a saturation temperature, into a pressure of the refrigerant. The temperature of the refrigerant may be measured in a direct manner, in which the temperature sensor is in contact with the refrigerant, or in an indirect manner, in which the temperature of an outer surface of a pipe or a heat exchanger is measured. The outdoor temperature sensor 93 is provided at the parallel heat exchanger 4-1, and measures the temperature of the outdoor air.

The indoor pressure sensor 91 is provided at the indoor heat exchanger 5, and measures the pressure of the refrigerant flowing through the indoor heat exchanger 5. When the indoor heat exchanger 5 operates as a condenser, the indoor pressure sensor 91 functions as a condensing pressure sensor. When the indoor heat exchanger 5 operates as an evaporator, the indoor pressure sensor 91 functions as an evaporating pressure sensor. The indoor pressure sensor 91 may be disposed on the discharge side of the compressor 1 to measure a discharge pressure. At a portion where the refrigerant is in the two-phase gas-liquid state, a temperature sensor to measure the temperature of the refrigerant may be used instead. In such a case, a temperature measured by the temperature sensor is converted, as a saturation temperature, into a pressure of the refrigerant. The indoor temperature sensor 94 is provided at the indoor heat exchanger 5, and measures the temperature of the indoor air.

For the refrigerant circulated through the refrigerant circuit, for example, a chlorofluorocarbon refrigerant or a HFO refrigerant can be used. Examples of chlorofluorocarbon refrigerants include HFC-based refrigerants, such as R32, R125, and R134a, and refrigerant mixtures of HFC-based refrigerants, such as R410A, R407c, and R404A. Examples of HFO refrigerants include HFO-1234yf, HFO-1234ze(E), and HFO-1234ze(Z). As other refrigerants, $CO_2$ refrigerant, HC refrigerant, ammonia refrigerant, and refrigerants for vapor compression heat pump circuits including refrigerant mixtures of the above-described refrigerants, such as a refrigerant mixture of R32 and HFO-1234yf, can be used. Examples of HC refrigerants include propane and isobutane.

The air-conditioning apparatus 100 is configured to operate in a cooling operation mode, a normal heating operation mode, a reverse-cycle defrosting operation mode, and a heating-defrosting operation mode. In the cooling operation mode, the parallel heat exchangers 4-1 and 4-2 each operate as a condenser, and the indoor unit B cools the room. In the normal heating operation mode, the parallel heat exchangers 4-1 and 4-2 each operate as an evaporator, and the indoor unit B heats the room. In the reverse-cycle defrosting operation mode, the refrigerant flows through the main circuit 15 in the same direction as that in the cooling operation. The reverse-cycle defrosting operation mode is an operation mode that is implemented during a normal heating operation, for example, when a duration during which the normal heating operation is performed exceeds a preset maximum duration threshold for the normal heating operation, or when the parallel heat exchangers 4-1 and 4-2 are frosted.

The heating-defrosting operation mode is an operation mode in which one of the parallel heat exchangers 4-1 and 4-2 is defrosted and the other one of the parallel heat exchangers 4-1 and 4-2 operates as an evaporator to maintain the heating operation. In the heating-defrosting operation mode, the parallel heat exchangers 4-1 and 4-2 are defrosted by turns. For example, in the heating-defrosting operation mode, one of the parallel heat exchangers 4-1 and 4-2 operates as an evaporator to perform the heating operation, and the other one of the parallel heat exchangers 4-1 and 4-2 is defrosted. In the heating-defrosting operation mode, after the other one of the parallel heat exchangers 4-1 and 4-2 is completely defrosted, the other one of the parallel heat exchangers 4-1 and 4-2 operates as an evaporator to perform the heating operation, and the one of the parallel heat exchangers 4-1 and 4-2 is defrosted. The heating-defrosting operation mode is implemented during the normal heating operation when the parallel heat exchangers 4-1 and 4-2 are frosted. The normal heating operation mode may be switched to the heating-defrosting mode when a driving frequency of the compressor 1 falls below a frequency threshold.

The controller 90 controls, for example, the cooling operation and the heating operation of the indoor unit B, changing a set room temperature, the first opening and closing devices 6-1 and 6-2, the second opening and closing devices 9-1 and 9-2, the flow control device 8, and the pressure reducing device 3. The controller 90 in Embodiment 1 includes a microcomputer including a controller processor, such as a central processing unit (CPU). The controller 90 further includes a storage device (not illustrated) and has data on programs of procedures for control, for example. The controller processor executes a process based on the data on the programs to achieve control.

The controller 90 in Embodiment 1 adjusts the opening degree of the flow control device 8 such that the refrigerant corresponding to an increase in flow rate of the refrigerant flowing through the main circuit 15 in the heating-defrosting operation mode as compared with that in the normal heating operation mode flows through the parallel heat exchanger 4-1 or 4-2 being defrosted. In this case, the evaporating pressure sensor in the normal heating operation mode and the heating-defrosting operation mode is the outdoor pressure sensor 92-1 or 92-2 to measure the pressure of the refrigerant flowing through the parallel heat exchanger 4-1 or 4-2 operating as an evaporator.

Furthermore, the controller 90 determines whether an operation in the heating-defrosting operation mode has finished within a preset maximum duration such that the temperature of the refrigerant flowing through the parallel heat exchanger 4-1 or 4-2 defrosted has reached a temperature at or above a defrosting threshold, which is a predetermined temperature. If the operation has finished such that the temperature of the refrigerant has reached a temperature at or above the defrosting threshold, the controller 90 extends a heating setting duration, which is a maximum operating duration in the normal heating operation mode. Specifically, the controller 90 extends the heating setting duration during which the normal heating operation mode is continued until the operation mode is switched to the reverse-cycle defrosting operation mode. If the operating duration in the heating-defrosting operation mode exceeds the preset maximum duration, the controller 90 may switch the operation mode to the normal heating operation mode and then switch the operation mode to the reverse-cycle defrosting operation mode. Furthermore, the controller 90 may be configured to switch the normal heating operation mode to the heating-defrosting operation mode when the temperature of the indoor air is close to the set room temperature and the driving frequency of the compressor 1 is lower than the frequency threshold.

An operation of the controller 90 controlling the flow control device 8 in the heating-defrosting operation mode will now be described. It is assumed herein that the parallel heat exchanger 4-2 is a heat exchanger that is defrosted. When the normal heating operation mode is switched to the heating-defrosting operation mode, the indoor temperature sensor 94 measures a condensing temperature Tc in the normal heating operation. The controller 90 determines an evaporating temperature Te converted based on pressures measured by the outdoor pressure sensors 92-1 and 92-2. The outdoor temperature sensor 93 measures an outdoor air temperature Tout of the outdoor air. The controller 90 needs to estimate the density of the refrigerant on the suction side of the compressor 1 before calculating the flow rate of the refrigerant. For example, assuming that the refrigerant on the suction side of the compressor 1 is saturated vapor, the controller 90 calculates a refrigerant flow rate in the normal heating operation on the basis of an evaporating pressure converted from the evaporating temperature Te and the driving frequency of the compressor 1. The capacity, Qe, of the parallel heat exchanger 4-1 or 4-2 operating as an evaporator in the normal heating operation is expressed by Equation (1), where A is the heat exchange area of the evaporator, and K is the overall heat transfer coefficient of the evaporator.

[Math. 1]

$$Qe = A \cdot K(Tout - Te) \quad (1)$$

In the heating-defrosting operation mode, only the parallel heat exchanger 4-1 operates as an evaporator, so that the heat exchange area A of the evaporator in this mode is reduced to half that in the normal heating operation mode. In the heating-defrosting operation mode, the controller 90 increases the driving frequency of the compressor 1 to ensure a sufficient heating capacity and a sufficient defrosting capacity. Let a be the ratio of the driving frequency of the compressor 1 in the heating-defrosting operation mode to that in the normal heating operation mode. The capacity of the parallel heat exchanger 4-1 or 4-2 operating as an evaporator in the heating-defrosting operation mode is expressed by Equation (2).

[Math. 2]

$$a \cdot Qe = (A/2) \cdot K(Tout - Te\_ondef) \quad (2)$$

Based on Equations (1) and (2), an evaporating temperature Te_ondef in the heating-defrosting operation mode that is necessary to calculate the refrigerant flow rate in the heating-defrosting operation mode is given by Equation (3).

[Math. 3]

$$Te\_ondef = (1 - 2a)Tout + 2a \cdot Te \quad (3)$$

The evaporating temperature Te_ondef in the heating-defrosting operation mode given by Equation (3) is lower than the evaporating temperature Te in the normal heating operation mode. Accordingly, an evaporating pressure converted, as a saturation pressure, from the lower evaporating temperature is also lower. A lower evaporating pressure results in a lower density of the refrigerant in the heating-defrosting operation mode, leading to a lower refrigerant flow rate. This results in a reduction in capacity of the evaporator in the heating-defrosting operation mode, causing the need to again calculate the evaporating temperature Te_ondef in the heating-defrosting operation mode. Let b be the rate of reduction in refrigerant flow rate. A corrected capacity of the parallel heat exchanger 4-1 or 4-2 operating as an evaporator in the heating-defrosting operation mode is expressed by Equation (4).

[Math. 4]

$$a \cdot b \cdot Qe = (A/2) \cdot K(Tout - Te\_ondef2) \quad (4)$$

Based on Equations (1) and (4), an evaporating temperature Te_ondef2 in the heating-defrosting operation mode that is necessary to maintain the state of the cycle is given by Equation (5).

[Math. 5]

$$Te\_ondef2 = (1 - 2a \cdot b)Tout + 2a \cdot Te \quad (5)$$

The controller 90 repeats the above-described calculations such that the evaporating temperature and the refrigerant flow rate converge to certain values, thus obtaining the evaporating temperature Te_ondef2 in the heating-defrosting operation mode. The controller 90 converts the evaporating temperature Te_ondef2, given by Equation (5), into an evaporating pressure as a saturation pressure, and calculates a refrigerant flow rate based on the refrigerant density and the driving frequency of the compressor 1.

The evaporating temperature Te_ondef2 in the heating-defrosting operation mode may be obtained by subtracting a correction constant Te_hosei obtained in advance from, for example, a test, from the evaporating temperature Te_ondef in the normal heating operation mode, as expressed by Equation (6).

[Math. 6]

$$Te\_ondef2 = Te\_ondef - Te\_hosei \quad (6)$$

The controller 90 calculates an overall refrigerant flow rate Gdef of the heating-defrosting operation on the basis of the evaporating pressure converted from the evaporating temperature Te_ondef2, as a saturation temperature, calculated in the above-described manner and the driving frequency of the compressor 1. To maintain the room temperature, the controller 90 causes the refrigerant in the heating-defrosting operation mode to flow into the indoor unit B at a refrigerant flow rate Gh that is the same as that in the normal heating operation mode.

The controller 90 causes the refrigerant to flow into the parallel heat exchanger 4-1 or 4-2 to be defrosted at a flow rate obtained by subtracting the refrigerant flow rate Gh in the normal heating operation mode from the overall refrigerant flow rate Gdef in the heating-defrosting operation. In other words, when the normal heating operation mode is switched to the heating-defrosting operation mode, the controller 90 adjusts the opening degree of the flow control device 8 such that the refrigerant corresponding to an increase in flow rate flows through the parallel heat exchanger 4-1 or 4-2 to be defrosted. The higher the driving frequency of the compressor 1 and the density of the refrigerant, the higher the flow rate of the refrigerant. The density of the refrigerant is directly proportional to the evaporating pressure. Therefore, when the normal heating operation mode is switched to the heating-defrosting operation mode, a large reduction in evaporating pressure in the parallel heat exchanger 4-1 or 4-2 operating as an evaporator or a small increase in driving frequency of the compressor 1 leads to the need to maintain the heating capacity. For this reason, the flow rate of the refrigerant flowing through the parallel heat exchanger 4-1 or 4-2 to be defrosted is to be reduced. The controller 90 reduces the opening degree of the flow control device 8. The opening degree of the pressure reducing device 3 may be adjusted based on a change in evaporating pressure accompanied by a change in heat exchange area of the parallel heat exchanger 4-1 or 4-2 operating as an evaporator or based on a change in driving frequency of the compressor 1.

In the heating-defrosting operation mode, for example, a reduction in driving frequency of the compressor 1 caused by a protection operation of protecting the air-conditioning apparatus 100 may cause a condensing pressure measured by the indoor pressure sensor 91 to be lower than a condensing pressure in the normal heating operation mode. In such a case, the controller 90 may perform control to suppress a reduction in condensing pressure by reducing the opening degree of the flow control device 8 or the pressure reducing device 3.

The flow rate of the refrigerant flowing through the parallel heat exchanger 4-1 or 4-2 to be defrosted may be determined to achieve the defrosting capacity necessary to completely melt frost. For example, the necessary defrosting capacity can be calculated based on the outdoor air temperature, a cumulative operating duration in the normal heating operation mode, or a defrosting duration in the heating-defrosting operation mode. Specifically, the controller 90 adjusts, based on the outdoor air temperature, the cumulative operating duration in the normal heating operation mode, or the defrosting duration in the heating-defrosting operation mode, the opening degree of the flow control device 8 such that the refrigerant flows through the parallel heat exchanger 4-1 or 4-2 to be defrosted.

A large opening degree of the flow control device 8, or a reduction in flow rate of the refrigerant supplied to the indoor heat exchanger 5, results in a reduction in condensing pressure in the indoor heat exchanger 5. To maintain the condensing pressure, the opening degree of the pressure reducing device 3 may be reduced to a smaller value. Therefore, the controller 90 reduces the opening degree of the pressure reducing device 3 to a smaller value as the opening degree of the flow control device 8 is larger.

For example, when an evaporating temperature converted from a pressure measured by the indoor pressure sensor 91 is lower than a preset threshold, the controller 90 determines that frost is accumulated, and shifts the operation mode to the reverse-cycle defrosting operation mode or the heating-defrosting operation mode. Furthermore, when the difference between the outdoor air temperature and the evaporating temperature is greater than or equal to a preset threshold, and when a predetermined period of time has elapsed, the controller 90 determines that frost is accumulated, and shifts the operation mode to the reverse-cycle defrosting operation mode or the heating-defrosting operation mode.

<Operation of Controller 90>

Figure 2:
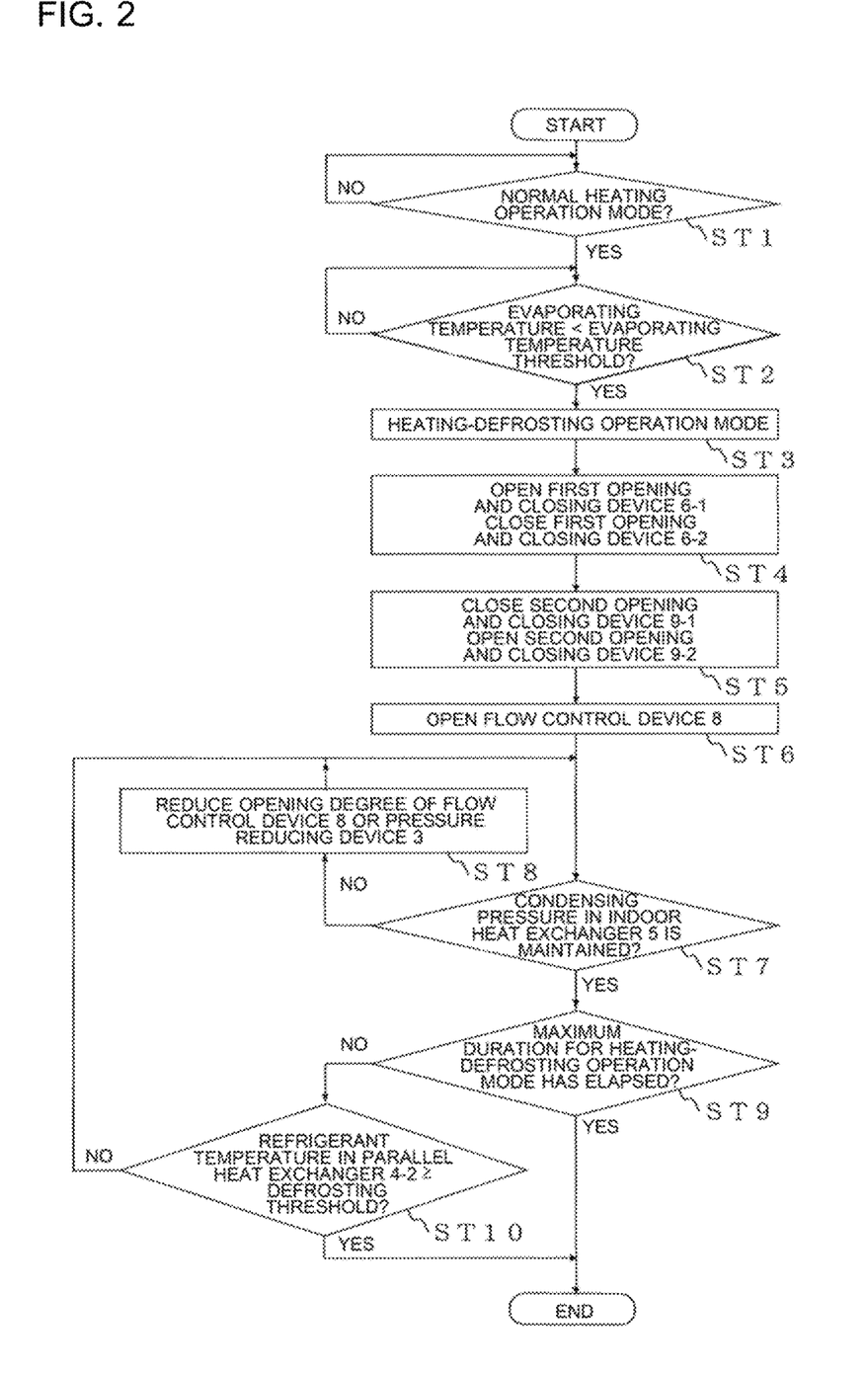
FIG. 2 is a diagram illustrating a flowchart of an operation of a controller in the air-conditioning apparatus according to Embodiment 1.

FIG. 2 is a diagram illustrating a flowchart of an operation of the controller 90 in the air-conditioning apparatus 100 according to Embodiment 1. An operation of the controller 90 in the heating-defrosting operation mode will now be described. It is assumed herein that the parallel heat exchanger 4-2 is selected as a target to be defrosted. A case where the parallel heat exchanger 4-2 is defrosted and the parallel heat exchanger 4-1 operates as an evaporator to continue heating will be described. Referring to FIG. 2, in response to determining that the operation mode is the normal heating operation mode (step ST1), the controller 90 determines whether an evaporating temperature of the refrigerant flowing through the parallel heat exchangers 4-1 and 4-2 is less than an evaporating temperature threshold (step ST2). For example, in response to determining that the evaporating temperature is less than the evaporating temperature threshold, the controller 90 determines that frost is accumulated on the parallel heat exchangers 4-1 and 4-2, and shifts the operation mode to the heating-defrosting operation mode (step ST3).

The controller 90 opens the first opening and closing device 6-1 and closes the first opening and closing device 6-2 (step ST4). Then, the controller 90 closes the second opening and closing device 9-1 and opens the second opening and closing device 9-2 (step ST5). Furthermore, the controller 90 opens the flow control device 8 (step ST6). This forms a passage that causes the parallel heat exchanger 4-2 to be defrosted and causes the parallel heat exchanger 4-1 to operate as an evaporator to continue heating.

The controller 90 determines, based on a pressure measured by the indoor pressure sensor 91, whether the condensing pressure in the indoor heat exchanger 5 is maintained (step ST7). The condensing pressure changes depending on, for example, a reduction in driving frequency of the compressor 1 or the magnitude of the opening degree of the flow control device 8. In response to determining that the condensing pressure in the indoor heat exchanger 5 is lower than that in the normal heating operation mode and is not maintained (NO in step ST7), the controller 90 reduces the opening degree of the flow control device 8 or the pressure reducing device 3 (step ST8).

In response to determining that the condensing pressure in the indoor heat exchanger 5 is maintained (YES in step ST7), the controller 90 determines whether the maximum duration for the heating-defrosting operation mode has elapsed (step ST9). In response to determining that the maximum duration for the heating-defrosting operation mode has elapsed (YES in step ST9), the controller 90 temporarily terminates control. Then, the controller 90 causes the parallel heat exchanger 4-1 to be defrosted. At this time, the controller 90 opens the first opening and closing device 6-2 and closes the first opening and closing device 6-1. Furthermore, the controller 90 closes the second opening and closing device 9-2 and opens the second opening and closing device 9-1. Thus, the parallel heat exchanger 4-1 is defrosted, and the parallel heat exchanger 4-2 operates as an evaporator to continue heating.

In response to determining that the maximum duration for the heating-defrosting operation mode has not elapsed (NO in step ST9), the controller 90 determines whether the temperature of the refrigerant flowing through the parallel heat exchanger 4-2 is greater than or equal to the defrosting threshold (step ST10). In response to determining that the temperature of the refrigerant flowing through the parallel heat exchanger 4-2 is greater than or equal to the defrosting threshold (YES in step ST10), the controller 90 temporarily terminates the control. Then, the controller 90 causes the parallel heat exchanger 4-1 to be defrosted. If the controller 90 determines that the temperature of the refrigerant flowing through the parallel heat exchanger 4-2 is not greater than or equal to the defrosting threshold (NO in step ST10), the process returns to step ST7. The controller 90 continues the process.

<Cooling Operation Mode>

Figure 3:
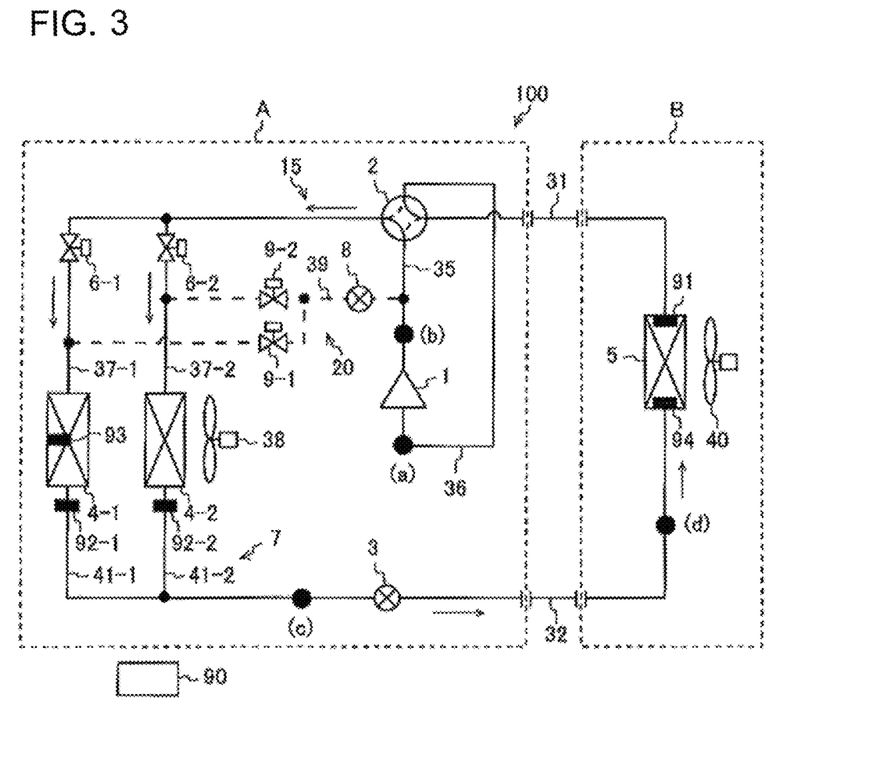
FIG. 3 is a diagram illustrating the flow of refrigerant in a cooling operation in the air-conditioning apparatus according to Embodiment 1.
Figure 4:
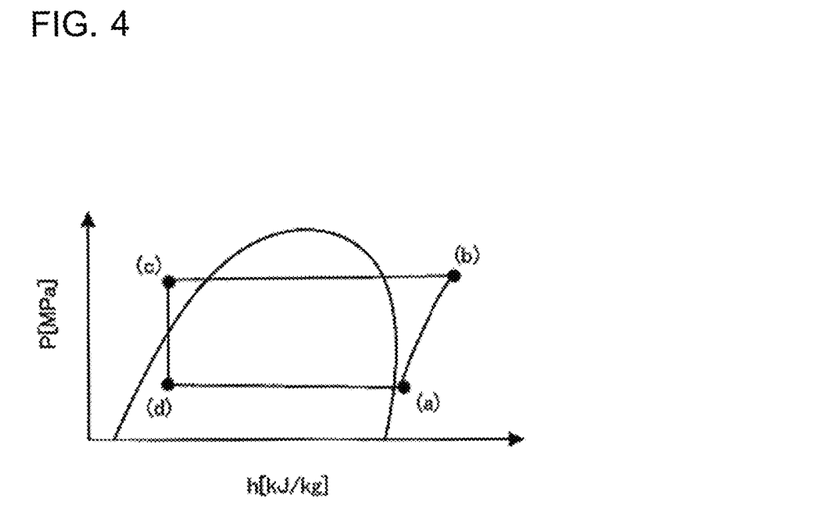
FIG. 4 is a pressure-enthalpy (p-h) diagram in the cooling operation in the air-conditioning apparatus according to Embodiment 1.

FIG. 3 is a diagram illustrating the flow of the refrigerant in the cooling operation in the air-conditioning apparatus according to Embodiment 1. FIG. 4 is a p-h diagram in the cooling operation in the air-conditioning apparatus 100 according to Embodiment 1. The flow of the refrigerant in the air-conditioning apparatus 100 in the cooling operation mode will now be described. In the cooling operation mode, the flow switching device 2 forms a passage that connects the discharge side of the compressor 1 to the parallel heat exchangers 4-1 and 4-2 and connects the suction side of the compressor 1 to the indoor heat exchanger 5. In this mode, the flow control device 8 is closed, and the first opening and closing devices 6-1 and 6-2 are open. In FIG. 3, solid lines represent portions through which the refrigerant flows, and dashed lines represent portions through which the refrigerant does not flow.

As illustrated in FIG. 3, in the cooling operation, the compressor 1 compresses the sucked refrigerant into high-temperature, high-pressure gas refrigerant and discharges the refrigerant. For a refrigerant compression process in the compressor 1, the refrigerant is compressed to be heated by an amount corresponding to the adiabatic efficiency of the compressor 1 as compared with adiabatic compression along an isentropic line. The change of the refrigerant at this time corresponds to a line segment extending from point (a) to point (b) in FIG. 4.

The high-temperature, high-pressure gas refrigerant discharged from the compressor 1 passes through the flow switching device 2 and is then divided into two streams, which flow through the respective first connection pipes 37-1 and 37-2. The refrigerant streams pass through the respective first opening and closing devices 6-1 and 6-2 and then enter the respective parallel heat exchangers 4-1 and 4-2 each operating as a condenser. The refrigerant in the parallel heat exchangers 4-1 and 4-2 exchanges heat with the outdoor air sent by the outdoor fan 38 and thus condenses and liquefies into medium-temperature, high-pressure liquid refrigerant. Considering a pressure loss, the change of the refrigerant in the parallel heat exchangers 4-1 and 4-2 is represented by a straight line slightly inclined to the horizontal, like a line segment extending from point (b) to point (c) in FIG. 4. The condensed, medium-temperature, high-pressure liquid refrigerant streams join together. Then, the refrigerant enters the pressure reducing device 3. The medium-temperature, high-pressure liquid refrigerant that has entered the pressure reducing device 3 is expanded and reduced in pressure into low-temperature, low-pressure, two-phase gas-liquid refrigerant in the pressure reducing device 3. The refrigerant in the pressure reducing device 3 changes under a constant enthalpy. The change of the refrigerant at this time corresponds to a vertical line segment extending from point (c) to point (d) in FIG. 4.

The two-phase gas-liquid refrigerant passes through the second extension pipe 32 and enters the indoor heat exchanger 5 operating as an evaporator. In the indoor heat exchanger 5, the refrigerant exchanges heat with the indoor air sent by the indoor fan 40 and thus evaporates and gasifies. At this time, the indoor air is cooled, thus cooling the room. Considering a pressure loss, the change of the refrigerant in the indoor heat exchanger 5 is represented by a straight line slightly inclined to the horizontal, like a line segment extending from point (d) to point (a) in FIG. 4. The evaporated, low-temperature, low-pressure gas refrigerant passes through the first extension pipe 31 and the flow switching device 2 and is then sucked into the compressor 1.

<Normal Heating Operation Mode>

Figure 5:
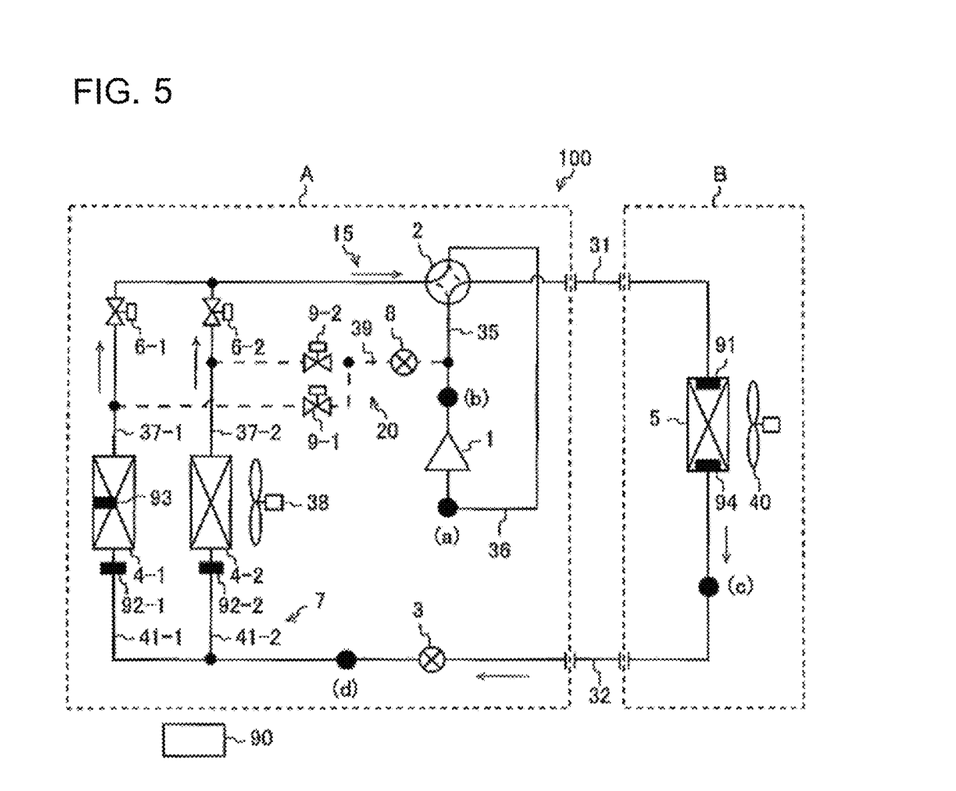
FIG. 5 is a diagram illustrating the flow of the refrigerant in a heating operation in the air-conditioning apparatus according to Embodiment 1.
Figure 6:
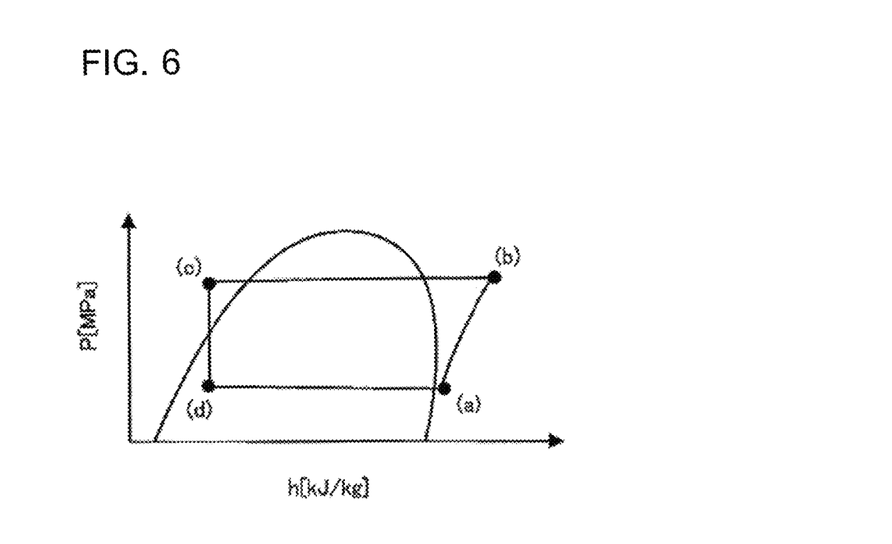
FIG. 6 is a p-h diagram in the heating operation in the air-conditioning apparatus according to Embodiment 1.

FIG. 5 is a diagram illustrating the flow of the refrigerant in the heating operation in the air-conditioning apparatus according to Embodiment 1. FIG. 6 is a p-h diagram in the heating operation in the air-conditioning apparatus 100 according to Embodiment 1. The flow of the refrigerant in the air-conditioning apparatus 100 in the normal heating operation mode will now be described. In the heating operation mode, the flow switching device 2 forms a passage by connecting the discharge side of the compressor 1 to the indoor heat exchanger 5 and connecting the suction side of the compressor 1 to the parallel heat exchangers 4-1 and 4-2. In this mode, the flow control device 8 is closed, and the first opening and closing devices 6-1 and 6-2 are open. In FIG. 5, solid lines represent portions through which the refrigerant flows, and dashed lines represent portions through which the refrigerant does not flow.

As illustrated in FIG. 5, in the heating operation, the compressor 1 compresses the sucked refrigerant into high-temperature, high-pressure gas refrigerant and discharges the refrigerant. For the refrigerant compression process in the compressor 1, the refrigerant is compressed to be heated by an amount corresponding to the adiabatic efficiency of the compressor 1 as compared with adiabatic compression along the isentropic line. The change of the refrigerant at this time corresponds to a line segment extending from point (a) to point (b) in FIG. 6.

The high-temperature, high-pressure gas refrigerant discharged from the compressor 1 passes through the flow switching device 2 and the first extension pipe 31 and then enters the indoor heat exchanger 5 operating as a condenser. In the indoor heat exchanger 5, the refrigerant exchanges heat with the indoor air and thus condenses and liquefies into medium-temperature, high-pressure liquid refrigerant. At this time, the indoor air is heated, thus heating the room. Considering a pressure loss, the change of the refrigerant in the indoor heat exchanger 5 is represented by a straight line slightly inclined to the horizontal, like a line segment extending from point (b) to point (c) in FIG. 6. The condensed, medium-temperature, high-pressure liquid refrigerant passes through the second extension pipe 32 and then enters the pressure reducing device 3. The medium-temperature, high-pressure refrigerant that has entered the pressure reducing device 3 is expanded and reduced in pressure into medium-pressure, two-phase gas-liquid refrigerant. The refrigerant in the pressure reducing device 3 changes under a constant enthalpy. The change of the refrigerant at this time corresponds to a vertical line segment extending from point (c) to point (d) in FIG. 6. The pressure reducing device 3 is controlled such that the degree of subcooling of medium-temperature, high-pressure liquid refrigerant ranges from approximately 5 K to approximately 20 K.

The two-phase gas-liquid refrigerant is divided into two streams, which enter the respective parallel heat exchangers 4-1 and 4-2 operating as evaporators. In the parallel heat exchangers 4-1 and 4-2, the refrigerant exchanges heat with the outdoor air and thus evaporates and gasifies. Considering a pressure loss, the change of the refrigerant in the parallel heat exchangers 4-1 and 4-2 is represented by a straight line slightly inclined to the horizontal, like a line segment extending from point (d) to point (a) in FIG. 6. The evaporated, low-temperature, low-pressure gas refrigerant streams enter the respective first connection pipes 37-1 and 37-2, pass through the respective first opening and closing devices 6-1 and 6-2, and then join together. The refrigerant passes through the flow switching device 2 and is then sucked into the compressor 1.

<Reverse-Cycle Defrosting Operation Mode>

The flow of the refrigerant in the reverse-cycle defrosting operation mode will now be described. The flow of the refrigerant is the same as that in an operation associated with the cooling operation mode. The reverse-cycle defrosting operation differs from the operation associated with the cooling operation mode in that the refrigerant is not reduced in pressure by the pressure reducing device 3 and that the indoor fan 40 does not operate. The high-temperature, high-pressure gas refrigerant discharged from the compressor 1 passes through the flow switching device 2 and is then divided into two streams, which flow through the respective first connection pipes 37-1 and 37-2. The refrigerant streams pass through the respective first opening and closing devices 6-1 and 6-2, flow through the respective first connection pipes 37-1 and 37-2, and then enter the respective parallel heat exchangers 4-1 and 4-2. The high-temperature, high-pressure gas refrigerant exchanges heat with frost on the parallel heat exchangers 4-1 and 4-2, thus melting the frost.

<Heating-Defrosting Operation Mode>

Figure 7:
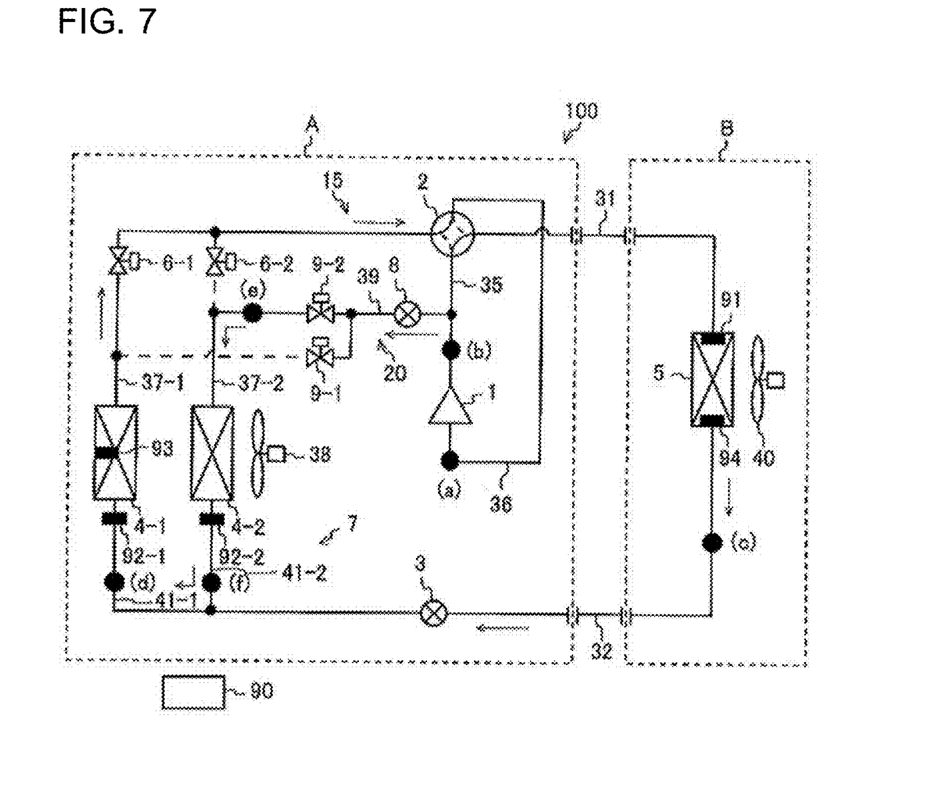
FIG. 7 is a diagram illustrating the flow of the refrigerant in a heating-defrosting operation in the air-conditioning apparatus according to Embodiment 1.
Figure 8:
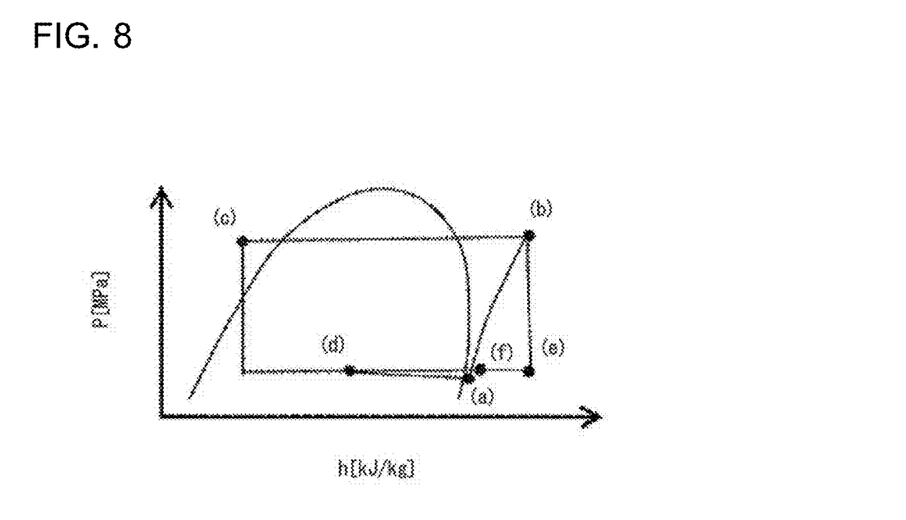
FIG. 8 is a p-h diagram in the heating-defrosting operation in the air-conditioning apparatus according to Embodiment 1.

FIG. 7 is a diagram illustrating the flow of the refrigerant in the heating-defrosting operation in the air-conditioning apparatus according to Embodiment 1. FIG. 8 is a p-h diagram in the heating-defrosting operation of the air-conditioning apparatus 100 according to Embodiment 1. The flow of the refrigerant in the air-conditioning apparatus 100 in the heating-defrosting operation mode will now be described. In the heating-defrosting operation mode, the flow switching device 2 forms a passage that connects the discharge side of the compressor 1 to the indoor heat exchanger 5 and connects the suction side of the compressor 1 to the parallel heat exchangers 4-1 and 4-2. In the heating-defrosting operation mode, one of the parallel heat exchangers 4-1 and 4-2 is selected as a target to be defrosted, and is defrosted. The other one of the parallel heat exchangers 4-1 and 4-2 operates as an evaporator to continue the heating operation. The first opening and closing devices 6-1 and 6-2 alternately switch between open and closed states. The second opening and closing devices 9-1 and 9-2 alternately switch between the open and closed states. The parallel heat exchangers 4-1 and 4-2 are alternately selected as a target to be defrosted. The flow of the refrigerant is changed in response to switching between the parallel heat exchanger 4-1 or 4-2 to be defrosted and the parallel heat exchanger 4-1 or 4-2 operating as an evaporator.

In Embodiment 1, assuming that the parallel heat exchanger 4-2 is selected as a target to be defrosted, a case where the parallel heat exchanger 4-2 is defrosted and the parallel heat exchanger 4-1 operates as an evaporator to continue heating will be described. In the defrosting-heating operation, the flow switching device 2 forms a passage that connects the discharge side of the compressor 1 to the indoor heat exchanger 5 and connects the suction side of the compressor 1 to the parallel heat exchangers 4-1 and 4-2. In this mode, the flow control device 8 is open, the first opening and closing device 6-1 is open, and the first opening and closing device 6-2 is closed. In FIG. 7, solid lines represent portions through which the refrigerant flows, and dashed lines represent portions through which the refrigerant does not flow.

The flow of the refrigerant in the main circuit 15 will now be described. As illustrated in FIG. 7, in the defrosting-heating operation, the compressor 1 compresses the sucked refrigerant into high-temperature, high-pressure gas refrigerant and discharges the refrigerant. For the refrigerant compression process in the compressor 1, the refrigerant is compressed to be heated by an amount corresponding to the adiabatic efficiency of the compressor 1 as compared with adiabatic compression along the isentropic line. The change of the refrigerant at this time corresponds to a line segment extending from point (a) to point (b) in FIG. 8.

Part of the high-temperature, high-pressure gas refrigerant discharged from the compressor 1 passes through the flow switching device 2 and the first extension pipe 31 and then enters the indoor heat exchanger 5 operating as a condenser. In the indoor heat exchanger 5, the refrigerant exchanges heat with the indoor air and thus condenses and liquefies into medium-temperature, high-pressure liquid refrigerant. At this time, the indoor air is heated, thus heating the room. Considering a pressure loss, the change of the refrigerant in the indoor heat exchanger 5 is represented by a straight line slightly inclined to the horizontal, like a line segment extending from point (b) to point (c) in FIG. 8. The condensed, medium-temperature, high-pressure liquid refrigerant passes through the second extension pipe 32 and then enters the pressure reducing device 3. The medium-temperature, high-pressure refrigerant that has entered the pressure reducing device 3 is expanded and reduced in pressure into medium-pressure, two-phase gas-liquid refrigerant. The refrigerant in the pressure reducing device 3 changes under a constant enthalpy. After that, the refrigerant joins refrigerant leaving the parallel heat exchanger 4-2 being defrosted, which will be described later, resulting in an increase in enthalpy. The change of the refrigerant at this time corresponds to a vertical line segment extending from point (c) to point (d) in FIG. 8.

The two-phase gas-liquid refrigerant does not flow through the parallel heat exchanger 4-2 being defrosted, but enters the parallel heat exchanger 4-1 operating as an evaporator. In the parallel heat exchanger 4-1, the refrigerant exchanges heat with the outdoor air and thus evaporates and gasifies. Considering a pressure loss, the change of the refrigerant in the parallel heat exchanger 4-1 is represented by a straight line slightly inclined to the horizontal, like a line segment extending from point (d) to point (a) in FIG. 8. The evaporated, low-temperature, low-pressure gas refrigerant enters the first connection pipe 37-1, passes through the first opening and closing device 6-1 and then through the flow switching device 2, and is then sucked into the compressor 1.

The flow of the refrigerant in the bypass 20 will now be described. Part of the high-temperature, high-pressure gas refrigerant discharged from the compressor 1 flows through the bypass pipe 39. The refrigerant flowing through the bypass pipe 39 enters the flow control device 8, where the refrigerant is reduced in pressure. The refrigerant in the flow control device 8 changes under a constant enthalpy. This change corresponds to a vertical line segment extending from point (b) to point (e) in FIG. 8.

The refrigerant reduced in pressure by the flow control device 8 passes through the second opening and closing device 9-2, flows through the first connection pipe 37-2, and then enters the parallel heat exchanger 4-2 being defrosted. The refrigerant that has entered the parallel heat exchanger 4-2 exchanges heat with frost on the parallel heat exchanger 4-2 and is thus cooled. As described above, the high-temperature, high-pressure gas refrigerant discharged from the compressor 1 enters the parallel heat exchanger 4-2 and melts the frost on the parallel heat exchanger 4-2. The change of the refrigerant at this time corresponds to a line segment extending from point (e) to point (f) in FIG. 8. The refrigerant used to defrost the parallel heat exchanger 4-2 and leaving the parallel heat exchanger 4-2 joins the refrigerant flowing through the main circuit 15. Then, the refrigerant enters the parallel heat exchanger 4-1 operating as an evaporator and then evaporates.

In the air-conditioning apparatus 100 according to Embodiment 1, when the normal heating operation mode is switched to the heating-defrosting operation mode, the refrigerant corresponding to an increase in flow rate based on a change in driving frequency of the compressor 1 is caused to flow through the parallel heat exchanger 4-1 or 4-2 to be defrosted. For this purpose, the controller 90 adjusts the opening degree of the flow control device 8.

As described above, in the air-conditioning apparatus 100 according to Embodiment 1, the controller 90 determines the opening degree of the flow control device 8 in the heating-defrosting operation on the basis of an operation status in the normal heating operation. Thus, frost on the parallel heat exchanger 4-1 or 4-2 being defrosted can be removed while the heating capacity in the heating-defrosting operation is being maintained.

Figure 9:
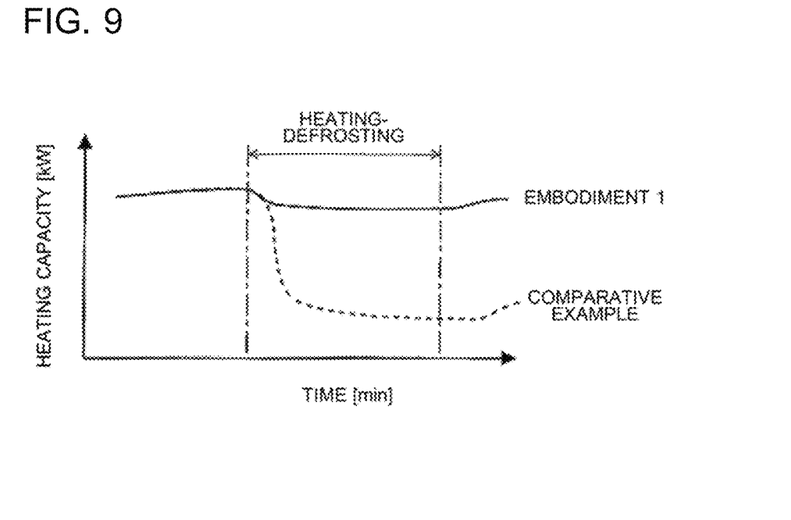
FIG. 9 is a diagram illustrating a graph showing a heating capacity in the heating-defrosting operation in the air-conditioning apparatus according to Embodiment 1.

FIG. 9 is a diagram illustrating a graph showing the heating capacity in the heating-defrosting operation in the air-conditioning apparatus according to Embodiment 1. In FIG. 9, the horizontal axis represents time [min], and the vertical axis represents the heating capacity [kW]. In FIG. 9, a solid line represents a case with control in the air-conditioning apparatus 100 according to Embodiment 1, and a dashed line represents, as Comparative Example, a case without the control in the air-conditioning apparatus 100 according to Embodiment 1. In Comparative Example illustrated in FIG. 9, a reduction in flow rate of the refrigerant supplied to the indoor heat exchanger 5 results in a reduction in discharge temperature in the heating-defrosting operation. In the air-conditioning apparatus 100 according to Embodiment 1, the opening degree of the flow control device 8 in the heating-defrosting operation is determined based only on the operation status in the normal heating operation. Therefore, the control can be used in another air-conditioning apparatus 100 including a compressor 1 or heat exchangers different in size from those in Embodiment 1.

Embodiment 2

Figure 10:
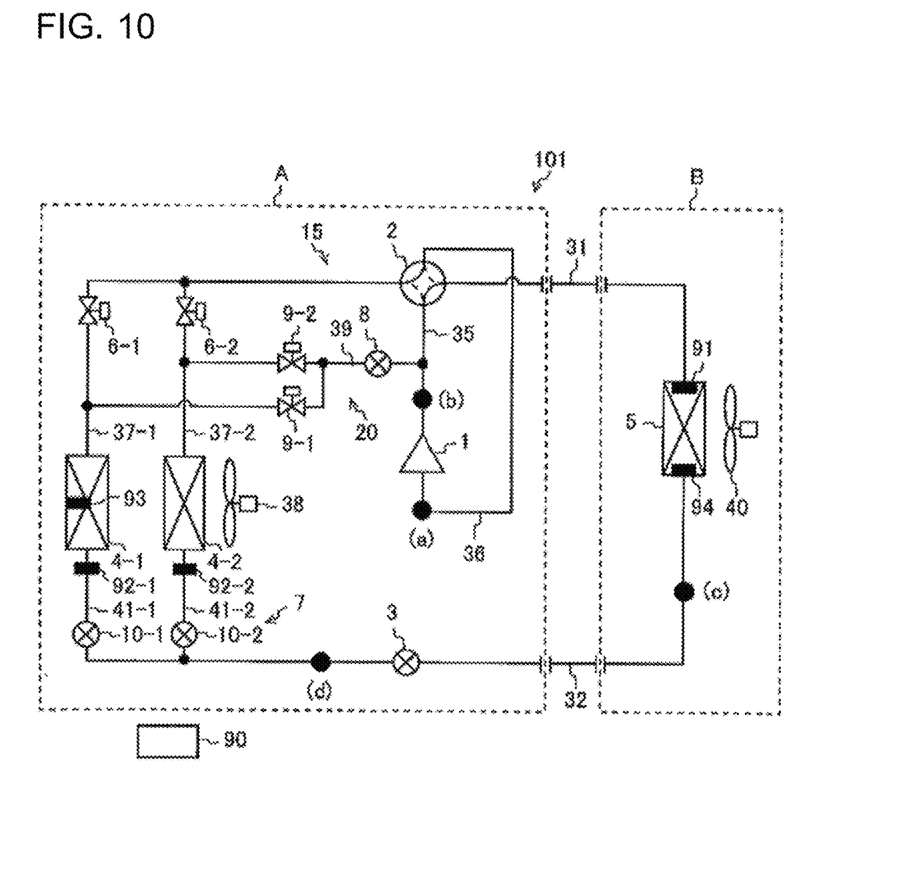
FIG. 10 is a diagram illustrating the configuration of an air-conditioning apparatus according to Embodiment 2.
Figure 11:
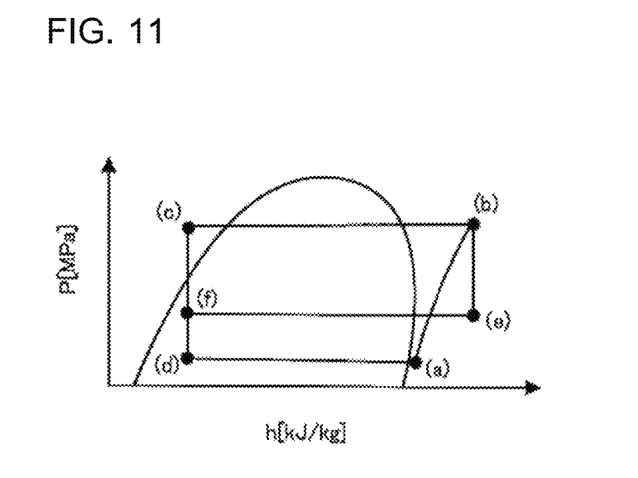
FIG. 11 is a p-h diagram in the heating-defrosting operation in the air-conditioning apparatus according to Embodiment 2.

FIG. 10 is a diagram illustrating the configuration of an air-conditioning apparatus according to Embodiment 2. FIG. 11 is a p-h diagram in the heating-defrosting operation in the air-conditioning apparatus according to Embodiment 2. An air-conditioning apparatus 101 according to Embodiment 2 differs from the air-conditioning apparatus 100 according to Embodiment 1 in that parallel pressure reducing devices 10-1 and 10-2 are arranged. In Embodiment 2, for example, devices common to Embodiment 1 are designated by the same reference signs. The following description will focus on the difference between Embodiment 1 and Embodiment 2.

As illustrated in FIG. 10, the parallel pressure reducing devices 10-1 and 10-2 are provided to the second connection pipes 41-1 and 41-2, respectively. The parallel pressure reducing devices 10-1 and 10-2 are pressure reducing valves or expansion valves that reduce the pressure of refrigerant to expand the refrigerant. Each of the parallel pressure reducing devices 10-1 and 10-2 is, for example, an electronic expansion valve whose opening degree is adjustable. In Embodiment 2, assuming that the parallel heat exchanger 4-2 is selected as a target to be defrosted, a case where the parallel heat exchanger 4-2 is defrosted and the parallel heat exchanger 4-1 operates as an evaporator to continue heating will be described.

In Embodiment 2, in the heating-defrosting operation, the controller 90 adjusts the opening degree of the parallel pressure reducing device 10-2 connected to the parallel heat exchanger 4-2 being defrosted such that a saturation temperature converted from a pressure in the parallel heat exchanger 4-2 being defrosted ranges from approximately 0 degrees C. to approximately 10 degrees C.

For example, when a saturation temperature converted from the pressure of the refrigerant in the parallel heat exchanger 4-1 or 4-2 being defrosted is 0 degrees C. or less, this temperature is less than or equal to 0 degrees C., which is the melting temperature of frost. Accordingly, the refrigerant does not condense. Therefore, defrosting is performed using only sensible heat whose amount is small. In this case, maintaining the heating capacity involves increasing the flow rate of the refrigerant flowing through the parallel heat exchanger 4-1 or 4-2 being defrosted. This results in a relative reduction in flow rate of the refrigerant that can be used for the heating operation. This leads to a lower heating capacity, causing the room to become less comfortable. At a high pressure of the refrigerant in the parallel heat exchanger 4-1 or 4-2 being defrosted, the difference between a saturation temperature of the refrigerant and 0 degrees C., which is the melting temperature of frost, is large. Accordingly, the refrigerant flowing through the parallel heat exchanger 4-1 or 4-2 liquefies immediately, causing an increase in amount of liquid refrigerant in the parallel heat exchanger 4-1 or 4-2. This also results in a relative reduction in flow rate of the refrigerant that can be used for the heating operation. This leads to a lower heating capacity, causing the room to become less comfortable.

In contrast, the air-conditioning apparatus 101 according to Embodiment 2 causes a saturation temperature converted from the pressure of the refrigerant entering the parallel heat exchanger 4-1 or 4-2 being defrosted to range from approximately 0 degrees C. to approximately 10 degrees C. Thus, a sufficient amount of refrigerant can be provided for the heating operation while latent heat whose amount is large is being used for defrosting. Therefore, while the heat exchanger is being defrosted, the heating capacity can be maintained, thus improving the comfort of the room. The change of the refrigerant at this time corresponds to a line segment extending from point (e) to point (f) in FIG. 11. Even if the amount of refrigerant in the parallel heat exchangers 4-1 and 4-2 being defrosted increases, a saturation temperature of the refrigerant in the parallel heat exchangers 4-1 and 4-2 being defrosted may be higher than 10 degrees C. as long as there is a sufficient amount of refrigerant for the heating operation. Furthermore, if the parallel pressure reducing devices 10-1 and 10-2 are capillary tubes, the parallel pressure reducing devices 10-1 and 10-2 may be previously designed such that a saturation temperature converted from a pressure in the parallel heat exchangers 4-1 and 4-2 being defrosted ranges from approximately 0 degrees C. to approximately 10 degrees C.

REFERENCE SIGNS LIST

1: compressor, 2: flow switching device, 3: pressure reducing device, 4-1, 4-2: parallel heat exchanger, 5: indoor heat exchanger, 6-1, 6-2: first opening and closing device, 7: parallel pipe, 8: flow control device, 9-1, 9-2: second opening and closing device, 10-1, 10-2: parallel pressure reducing device, 15: main circuit, 20: bypass, 31: first extension pipe, 32: second extension pipe, 35: discharge pipe, 36: suction pipe, 37-1, 37-2: first connection pipe, 38: outdoor fan, 39: bypass pipe, 40: indoor fan, 41-1, 41-2: second connection pipe, 90: controller, 91: indoor pressure sensor, 92-1, 92-2: outdoor pressure sensor, 93: outdoor temperature sensor, 94: indoor temperature sensor, 100, 101: air-conditioning apparatus, A: outdoor unit, B: indoor unit

The invention claimed is:
1. An air-conditioning apparatus comprising:
  a main circuit in which a compressor, a flow switching device, an indoor heat exchanger, a pressure reducing device, and a plurality of parallel heat exchangers connected in parallel with each other are connected by pipes, the main circuit serving as a refrigerant circuit through which refrigerant is circulated;
  a bypass pipe connecting one of the pipes that is connected to a discharge side of the compressor and some of the pipes that are connected to the plurality of parallel heat exchangers;
  a flow control valve provided to the bypass pipe, the flow control valve being configured to adjust a flow rate of the refrigerant flowing through the bypass pipe;
  an evaporating pressure sensor configured to measure an evaporating pressure of the refrigerant; and
  a controller,
  wherein the air-conditioning apparatus is configured to operate in a normal heating operation mode in which an operation is performed such that the plurality of parallel heat exchangers operate as evaporators and a heating-defrosting operation mode in which an operation is performed such that one of the plurality of parallel heat exchangers is defrosted and another of the plurality of parallel heat exchangers operates as an evaporator, and
  wherein in response to the operation associated with the normal heating operation mode being switched to the operation associated with the heating-defrosting operation mode, the controller adjusts an opening degree of the flow control valve using the evaporating pressure in the parallel heat exchanger that operates as an evaporator and a driving frequency of the compressor.

2. The air-conditioning apparatus of claim 1, wherein the controller adjusts the opening degree of the flow control valve such that the refrigerant corresponding to an increase in refrigerant flow rate based on a change in driving frequency of the compressor upon switching from the normal heating operation mode to the heating-defrosting operation mode is caused to flow through the parallel heat exchanger that is defrosted.

3. The air-conditioning apparatus of claim 2, further comprising:
  an outdoor temperature sensor configured to measure a temperature of outdoor air that exchanges heat with the refrigerant in the plurality of parallel heat exchangers,
  wherein the controller adjusts the opening degree of the flow control valve such that the refrigerant whose amount is obtained based on the temperature of the outdoor air, a cumulative operating duration of the operation associated with the normal heating operation mode, or a defrosting duration in the operation associated with the heating-defrosting operation mode is caused to flow through the parallel heat exchanger that is defrosted.

4. The air-conditioning apparatus of claim 3, wherein when the normal heating operation mode is switched to the heating-defrosting operation mode, the controller adjusts an opening degree of the pressure reducing device using at least one of a change in driving frequency of the compressor and a change in evaporating pressure associated with a change in heat exchange area of the parallel heat exchanger that operates as an evaporator relative to the heat exchange area of the plurality of parallel heat exchangers.

5. The air-conditioning apparatus of claim 2, wherein when the normal heating operation mode is switched to the heating-defrosting operation mode, the controller adjusts an opening degree of the pressure reducing device using at least one of a change in driving frequency of the compressor and a change in evaporating pressure associated with a change in heat exchange area of the parallel heat exchanger that operates as an evaporator relative to the heat exchange area of the plurality of parallel heat exchangers.

6. The air-conditioning apparatus of claim 1, further comprising:
an outdoor temperature sensor configured to measure a temperature of outdoor air that exchanges heat with the refrigerant in the plurality of parallel heat exchangers,
wherein the controller adjusts the opening degree of the flow control valve such that the refrigerant whose amount is obtained based on the temperature of the outdoor air, a cumulative operating duration of the operation associated with the normal heating operation mode, or a defrosting duration in the operation associated with the heating-defrosting operation mode is caused to flow through the parallel heat exchanger that is defrosted.

7. The air-conditioning apparatus of claim 6, wherein when the normal heating operation mode is switched to the heating-defrosting operation mode, the controller adjusts an opening degree of the pressure reducing device using at least one of a change in driving frequency of the compressor and a change in evaporating pressure associated with a change in heat exchange area of the parallel heat exchanger that operates as an evaporator relative to the heat exchange area of the plurality of parallel heat exchangers.

8. The air-conditioning apparatus of claim 1, wherein when the normal heating operation mode is switched to the heating-defrosting operation mode, the controller adjusts an opening degree of the pressure reducing device using at least one of a change in driving frequency of the compressor and a change in evaporating pressure associated with a change in heat exchange area of the parallel heat exchanger that operates as an evaporator relative to the heat exchange area of the plurality of parallel heat exchangers.

9. The air-conditioning apparatus of claim 1, further comprising:
a condensing pressure sensor configured to measure a condensing pressure of the refrigerant,
wherein the controller adjusts an opening degree of the pressure reducing device in the operation associated with the heating-defrosting operation mode to maintain a condensing pressure measured in the operation associated with the normal heating operation mode by the condensing pressure sensor.

10. The air-conditioning apparatus of claim 1, wherein the controller reduces the opening degree of the flow control valve in response to a reduction in driving frequency of the compressor in the operation associated with the heating-defrosting operation mode.

11. The air-conditioning apparatus of claim 1, wherein the controller reduces, based on a magnitude of the opening degree of the flow control valve, an opening degree of the pressure reducing device in the operation associated with the heating-defrosting operation mode.

12. The air-conditioning apparatus of claim 1, wherein the controller switches the normal heating operation mode to the heating-defrosting operation mode in response to determining that the driving frequency of the compressor in the operation associated with the normal heating operation mode is lower than a predetermined frequency threshold.

13. The air-conditioning apparatus of claim 1,
wherein the operation modes further include a reverse-cycle defrosting operation mode in which the plurality of parallel heat exchangers are defrosted, and
wherein when determining that an operating duration in the heating-defrosting operation mode exceeds a preset maximum duration, the controller switches the heating-defrosting operation mode to the normal heating operation mode and then switches the normal heating operation mode to the reverse-cycle defrosting operation mode.

14. The air-conditioning apparatus of claim 1,
wherein the operation modes further include a reverse-cycle defrosting operation mode in which the plurality of parallel heat exchangers are defrosted, and
wherein when determining that the operation associated with the heating-defrosting operation mode has finished within a preset maximum duration, the controller extends a heating setting duration in which the operation associated with the normal heating operation mode is performed until the normal heating operation mode is switched to the reverse-cycle defrosting operation mode.

15. The air-conditioning apparatus of claim 1, further comprising:
a plurality of parallel pressure reducing devices configured to reduce a pressure of the refrigerant, the plurality of parallel pressure reducing devices being arranged respectively for the plurality of parallel heat exchangers.

16. The air-conditioning apparatus of claim 15, wherein the controller adjusts the opening degree of the parallel pressure reducing device corresponding to the parallel heat exchanger that is defrosted such that a saturation temperature converted from a pressure of the refrigerant in the parallel heat exchanger that is defrosted ranges from 0 degrees C. to 10 degrees C.

* * * * *